(12) United States Patent
Tolhurst

(10) Patent No.: US 9,067,637 B2
(45) Date of Patent: Jun. 30, 2015

(54) ADJUSTABLE FOLDING HANDLEBAR FOR HUMAN POWERED VEHICLES

(76) Inventor: John Irven Tolhurst, Perth (AU)

( * ) Notice: Subject to any disclaimer, the term of this patent is extended or adjusted under 35 U.S.C. 154(b) by 577 days.

(21) Appl. No.: 13/096,351

(22) Filed: Apr. 28, 2011

(65) Prior Publication Data
US 2012/0272777 A1 Nov. 1, 2012

(51) Int. Cl.
B62K 21/16 (2006.01)
B62K 21/12 (2006.01)

(52) U.S. Cl.
CPC ......... *B62K 21/125* (2013.01); *Y10T 74/20396* (2015.01); *Y10T 74/20792* (2015.01); *Y10T 29/49826* (2015.01); *B62K 21/16* (2013.01)

(58) Field of Classification Search
CPC ............... Y10T 74/2078; Y10T 74/20624; Y10T 74/20852; Y10T 74/20798; Y10T 74/20792; Y10T 74/20804; Y10T 74/2081; Y10T 74/20816; Y10T 74/20822; Y10T 74/20828; Y10T 74/20786

USPC ............ 74/551.1–551.8, 547, 555, 488, 489, 74/525, 491; 29/248; 180/188.4; 280/278, 280/287; 482/51, 57
IPC .................................... B62H 1/14; B62K 21/16
See application file for complete search history.

(56) References Cited

U.S. PATENT DOCUMENTS

| 4,361,057 A * | 11/1982 | Kochera ..................... 74/551.4 |
| 4,417,745 A * | 11/1983 | Shomo ......................... 280/287 |
| 2006/0090589 A1* | 5/2006 | Ording et al. ............... 74/551.8 |

* cited by examiner

*Primary Examiner* — Marcus Charles
*Assistant Examiner* — Yamilka Pinero Medina
(74) *Attorney, Agent, or Firm* — Leyendecker and Lemire; Kurt Leyendecker

(57) ABSTRACT

Embodiments of the present invention comprise a folding handlebar to allow the rider to adopt an aerodynamic riding position without superfluous bars protruding left and right and a control system so the rider has full access to braking and gear changing whether riding in the aero or non aero position.

18 Claims, 15 Drawing Sheets

ADJUSTABLE FOLDING HANDLEBAR FOR HUMAN POWERED VEHICLES

FIELD OF THE INVENTION

The present invention relates generally to handlebars for use on human powered vehicles.

BACKGROUND

Human powered devices, most commonly bicycles, have migrated from a utilitarian purpose to a sport and recreation purpose over the course of the last 100 years.

The huge majority of bicycles sold and available in the marketplace today are pedal powered, driving a pair of cranks to which a chainring is connected that carries a chain that is operatively coupled to a toothed cog attached to a wheel, thereby transferring power to the wheel. Meanwhile the upper body is stabilised by providing the arms with a pair of handlebars located so the arms can be approximately perpendicular to the trunk of the body and able therefore to provide a leverage point and proper stability to the torso and the possibility to drive the hips when the rider is aiming to produce maximum power.

The nature of the handlebar is that is it positioned to provide stability to the torso while at the same time allowing the rider to steer the vehicle. On a standard safety bike or diamond frame bicycle the placement of the handlebars is such that the arms (or at least upper arms) are positioned somewhat parallel to the steering axis. This allows the bars to be pushed by one hand and pulled with the other hand while keeping the steering and balance of the bike under control. A rider sprinting to the finish line cants the frame left and right in time with her pedalling stroke and is enabled to do this by the particular structure and placement of the steering axis and handlebar system.

The mechanical solution of the handlebar and the cultural interpretation of its use is deeply embedded in cycling as a sport, the bicycle industry, and in the psychology of the general community in its attitudes to this mechanical object.

There is, however, one fundamental drawback to the handlebar that is acutely experienced by Time Trial (TT) riders who need to lower their upper body, narrow their elbows and point their forearms forward in an effort to reduce aerodynamic drag and allow greater speed with the same power output. On these bikes, a second pair of grips is often provided on a second pair of bars attached perpendicularly to the standard handlebar and at a spacing of approximately one hands width either side of the bicycle stem much closer together than the other provided pair of bars. Collectively handlebars including two pairs of bars, one inboard of the other pair, are often referred to as one or both of time trail bars and triathlon bars. To the rear end of these additional inboard bars are often mounted a pair of shaped pads that support the forearm close to the elbow. The drawback of this arrangement is that the bike carries two sets of grips, so at all times the superfluous pair of grips and their supporting framework is creating aerodynamic drag and adding weight thereby requiring power from the rider's limited supply and thus preventing the rider from achieving their best or fastest time.

Triathlon bars typically place thumb shift levers on the ends of the inboard bars as a user is likely going to be resting his hands on these bars most often during a time trail or a triathlon preventing the need for the user to move his or her hands and disrupt aerodynamic flow to change gears. The brakes are not used nearly as often during a time trial and as such the brake levers are most often placed on the outboard pair of bars at their respective distal ends. While moving a user's arms from the inboard to outboard position will induce drag that will use energy, the amount lost will be much less than the kinetic energy the user is intending to lose through the application of the brakes anyhow.

Problems can arise when the user is on one set of the bars and desires to effect a change requiring one or both of his/her hands to be on the other set of bars. For instance, while climbing and using the outer bars for leverage, the user must reach in to the inner bars to change the gear which can have a deleterious effect on momentum especially when the user is using the bars as a leverage point to assist in propulsion.

More significantly, if the rider is crouched low on the inner bars and is at speed when a dangerous road hazard is identified, there is a critical delay while the rider moves their hand to the outer bars in order to apply the brakes. The European standard for bicycle braking performance is consistent with a de-acceleration at half the acceleration due to gravity, or in simple numbers, 5 meters per second squared (5 m/s$^2$). Road safety studies and simple calculations of the distance travelled at 46.8 kph, or 13 m/s during the time it takes to apply the brakes shows how critical reaction time is. At 46.8 kph or 13 m/s, a speed that is easily attained on a time trial bicycle, the braking distance is 16.9 m.

A study titled 'Evaluation of brake reaction times on a motorcycle' was produced by the Promocycle Foundation in Quebec, Canada in Jan. 5, 2003 (FMQ-BRT 0.154). This study shows that if the hand is positioned over the front brake lever an average reaction time of 0.359 seconds was recorded, while if the hand was not covering the lever, an average braking reaction time of 0.545 was found, a difference of 0.186 seconds—it takes valuable time to lift the right fingers or right foot over the brake levers of a motorcycle. At 13 m/s, a rider will travel 2.4 m during the reaction time, so the total stopping distance is unlikely to be less than 19.3 m.

There are no studies known to the inventor on the braking reaction time taken by a time trial rider if the body is in the aero position with hands on the inner grips or the inboard bars while the brake levers are on the outer bars. We can note that having the right hand fingers over the front brake lever of a motorcycle is a very close analogue for having the fingers of either or both hands over the brake levers on a bicycle. We can note the 0.186 second improved time if the rider covers the lever with the fingers rather than wrap the fingers on the handlebar, so we know that even very small preparatory movements cost valuable time. It is conservative to expect that a time trial rider will take at least one second to use her back muscles to lift her upper body weight and allow her hands to transfer to the outer grips whereupon the brake levers can be actuated. For the purposes of illustration, we can calculate the stopping distance when one second is added to the reaction time caused by the rider moving their hands to the outer grip position in order to apply the brakes.

A further one second delay to begin applying the brakes causes the rider to overshoot the possible stopping distance by 13 meters, if the rider is travelling at 13 m/s. This distance of 13 m is not far short of the total stopping distance of a rider who is ready to apply the brakes, 19.3 m. At the stopping point achieved by a rider at 13 m/s braking at 0.5 g with a normal reaction time, a similar rider with a reaction time delayed by one seconds will be still travelling 11.4 m/s or 41 kph, fast enough to do serious injury to the rider in a situation where a bicycle without this fundamental flaw would have pulled up safely. This is fundamentally dangerous.

To address this fundamental danger to the time trial rider, especially when time trial bikes are ridden in traffic rather than on controlled courses, it is possible to install a second brake lever pair to the inner bars.

Folding handlebars that permit a user to fold a bicycle for transport or storage are known in the prior art; however, the prior art does not disclose handlebars that can be moved from an outer position to a more aerodynamic position. The prior art further fails to disclose or suggest handlebars in which the movement of the bars can be accomplished while the bicycle is being ridden.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DETAILED DESCRIPTION

Figure 1:
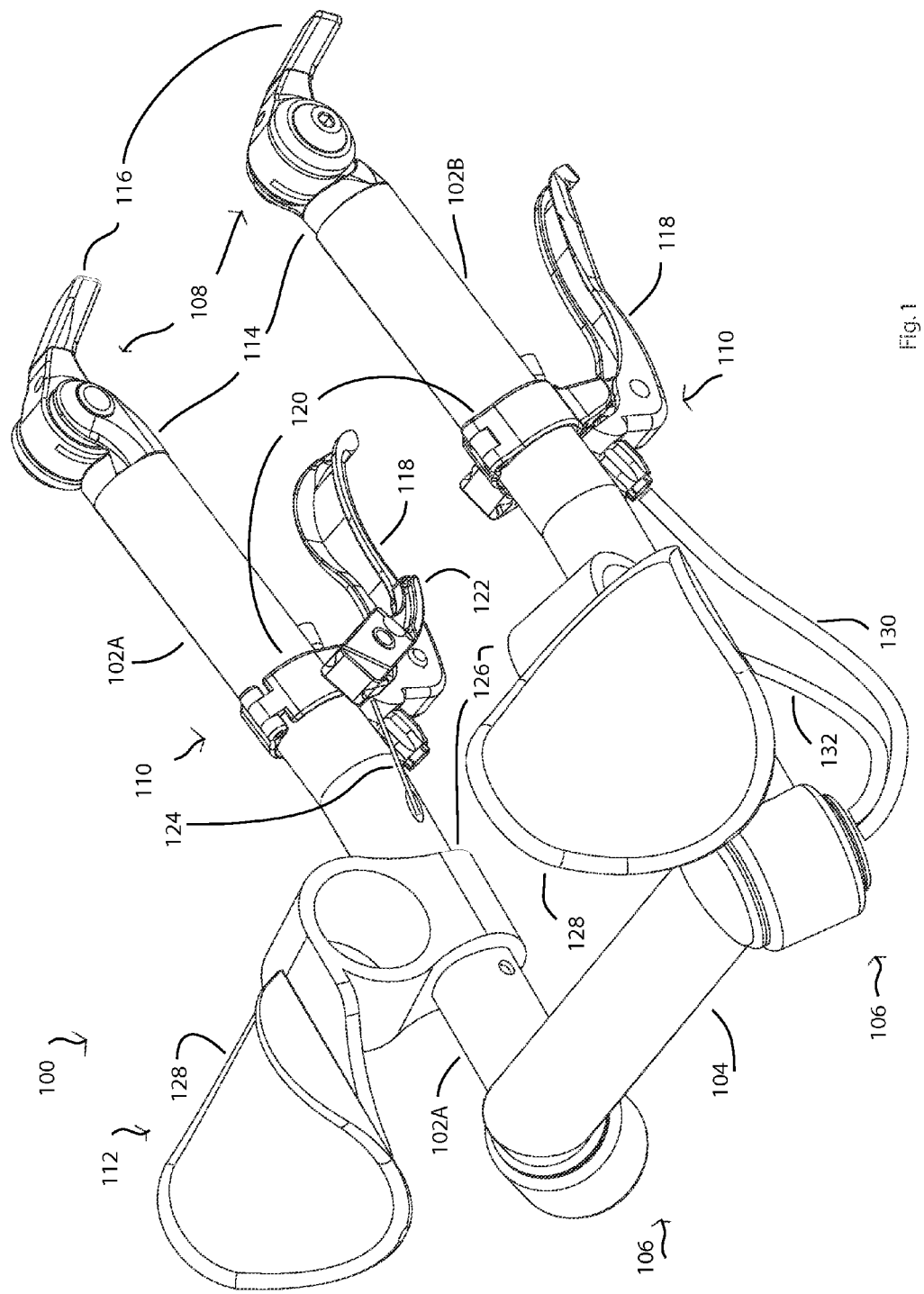
FIG. 1 is a isomeric view of the handlebar in a folded configuration with control components attached according to an embodiment of the present invention.

Embodiments of the present invention comprise handlebars that include only two bar extensions (or sections) instead of the four common in prior art time trial bars. The two bar extensions (referred herein as left and right arm sections) can be folded (or pivoted) while the rider is in motion between an aerodynamic position with the handholds placed relative close together and a second position permitting the rider to apply greater leverage using his/her hands, arms and upper body where the handholds are more widely spaced apart.

Embodiments of the handlebars place both brake and shift levers on each of the left and right arm sections wherein a rider can cover the brakes with his/her hands whether in either handlebar position and shift easily without having to move his/her hands from one bar/section to another. This is in contrast to prior art time trial bars wherein two pairs of bar extensions or arm sections are provided wherein a rider has to move to the aerodynamic position to shift gears and the wide position to brake. As discussed above, this can have serious safety implications. In placing the brake controls and shift controls on the same arm sections, embodiments of the invention include a novel bar end shifter that routs the associated shift cable internally through the body of the shifter directly into the internal cavity of an associated hollow interior of the left or right arm section. The new shifter eliminates the need to run a shift cable and its associated housing over the outside of the arm section in the handgrip/handhold portion thereof resulting in a smoother and rounder grip region that is more comfortable to hold for long periods.

TERMINOLOGY

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

The term "couple" or "coupled" as used in this specification and the appended claims refers to either an indirect or direct connection between the identified elements, components or objects. Often the manner of the coupling will be related specifically to the manner in which the two coupled elements interact.

The phrases "upright-style bicycle" and "upright-style bicycle frame" and similar phrases refer to bicycles and frames respectively wherein the rider typically sits upright on a small seat/saddle typically leaning forwardly bracing his/her arm/hands against a pair of handlebars. The "upright-style bicycle" is the most common and well-known type of bicycle and accordingly the phrase as used herein does not deviate from its commonly held meaning. In contrast, a "recumbent bicycle" is one in which the rider leans generally rearwardly in a supine position and the seat typically includes a backrest for support.

The term "road bike" refers to the racing style of bike that conforms to the prescriptions of the Union International Cyclist governing competitive road racing.

The terms "left arm section" and "right arm sections" as used herein refer to extensions of the handlebar that include a handhold or handgrip portion on which a rider holds the bar with his/her hands. In many variations of the arm sections, they have hollow interiors although variations are contemplated where this is not necessarily the case.

The term "base section" as used herein refers to a portion of the handlebars that is positioned generally transverse or normal to the direction of travel of a bicycle when installed thereon. It is through the base section that the handlebars are most typically coupled to a bicycle often through a stem. As with the arms sections, the base section in many variations has a hollow interior although other variations that are not hollow and/or tubular are also contemplated. The left and right ends of the base section (also referred to as left and right base ends) are coupled with the proximal ends of respective arm sections through a respective left or right "pivot mechanism".

The terms "left pivot mechanism" and "right pivot mechanism" as used herein refer to the pivoting joints between the respective left and right arm sections with the base section. The pivot mechanisms permit a rider to move each arm section between at least first and second positions.

The terms "first left arm position" and "first right arm position" as used herein refers to the position of the respective arm sections when they are in a folded position with each arm parallel to the other and spaced closely together. The "first position" is used by a rider to maximize aerodynamic efficiency. A top view with both arm sections in the first positions is provided in FIG. 3.

The terms "second left arm position" and "second right arm position" as used herein refers to the position of the respective arm sections when they are in an unfolded position with each arm diverging outwardly from the base section and each other. The "second position" is used by a rider to maximize stability and leverage. A view with both arm sections in the second positions is provided in FIG. 14.

The terms "actuator mechanism", "left actuator mechanism" and "right actuator mechanism" as used herein refer to mechanical devices that selectively lock and release the respective pivot mechanisms to permit a rider to move the arm sections between the first and second positions.

The term "brake lever assembly" as used herein refers to a brake lever, and the clamp or mounting structure used to secure the assembly including the lever to the respective left or right arm section. Depending on context, the term "brake lever assembly" may also include the associated brake cable and housing that is routed from the bars to the appropriate brake callipers on the bicycle.

The terms "thumb shifter" or "shift lever assembly" as used herein refers to the actuator used by a rider to change gears. The embodiment of an actuator described herein includes a shift lever, a base to which the shift lever is rotatably coupled and a clamping or wedge mechanism to secure the assembly to the associated arm section.

The term "driveline transmission device" as used herein refers to a derailleur or any other device that functionally causes the gearing of the bicycle to change responsive to input from a rider through a thumb shifter or shift lever assembly.

The term "arm rests" as used herein refer to pads and associated structure that are positioned behind the handgrips on the handlebars that permit a rider to rest his/her forearms proximate his/her elbows thereon when riding in the first position.

A First Embodiment of a Folding Handlebar

Referring primarily to FIGS. 1-3, 5 & 6, a first embodiment of the handlebar 100 comprises three primary sections: a base section 104 having left and right ends; a left arm section 102A having a proximal end and a distal end; and a right arm section 102B also having a proximal end and a distal end. As illustrated each of these sections is of substantially tubular construction and includes a substantially hollow interior. Concerning the left and right arm sections as shown, they are bent at an intermediate location with the portion of the sections forward of the bend comprising the location that a rider would grip the bars during use i.e. handholds or handgrips.

The base and arm sections 104 & 102 can be fabricated from any suitable material but are typically comprised of an aluminium alloy or a carbon fiber composite laminate. The bend in the arm sections can be (i) molded in place, such as when the arm sections are comprised of a composite material, (ii) formed by bending a straight tube, such as with an aluminium tube section, or (iii) fabricated by welding or otherwise joining two tubular pieces of material together at the desired angle.

The left and right ends of the base section 104 are both bent downwardly relative to the middle portion such that the bent ends are substantially symmetrical with each other relative to the middle portion. As with the bend in the arm sections, the bends in the base section can be formed by any suitable means. The angle of the bent portion relative to the middle portion of the base section can vary depending on the desired positioning of the left and right arms section when they are moved between first and second positions as will become clear from the disclosure below. Typically, the left and right ends include a cylindrical portion 180 with an annular outer surface of a specific diameter. These cylindrical portions form part of the respective left or right pivot mechanism 106 that joins the left and right arm sections 102A & B with the base section 104 and permit the desired movement of the arm sections between the first and second positions. These respective left and right cylindrical portions 180 of the left and right ends of the base section are also referred to as the left pivot inner cylinder and the right pivot inner cylinder and have a longitudinal axis (or axis of rotation) that defines the rotational path of the arm section 102 when moved from the first position to the second position.

At the proximal ends of the arm sections 102A&B a cylindrical tube portion 182 is provided. The cylindrical tube is relatively short having a length that generally corresponds to the length of the cylindrical portions 180 of the base section described above. The cylindrical tube portions include an annular inner surface having a diameter at least slightly greater than that of the diameter of the annular outer surface of the cylindrical portions described in the preceding paragraph. The cylindrical tube portions also form part of the respective left and right pivot mechanisms 106 and are adapted to be received over the corresponding cylindrical portions of the left and right pivot inner cylinders to permit rotational or pivotal movement relative to each other. The longitudinal axis of the cylindrical tube portion is generally normal to the longitudinal or rotational axis of the adjacent portion of the corresponding arm section, although the angle between the axes can vary depending on the particular design. The cylindrical tube can be attached/joined to the remainder of the arm section by any suitable means including welding, adhesive bonding, brazing and even in situ molding.

In addition to the respective left or right cylindrical portion 180 and the respective left or right cylindrical tube portion 182, the pivot mechanisms typically include one or more bushings/bearings 184 & 186 to help ensure a proper fit between the base section 104 and the respective arm section 102 as well as facilitate the rotation of the arm section as desired. To secure the arm sections in place on the cylindrical portions, a circular snap ring 188 is provided that fits within an annular groove 190 of the cylindrical portion proximate the outer edge thereof.

Figure 6:
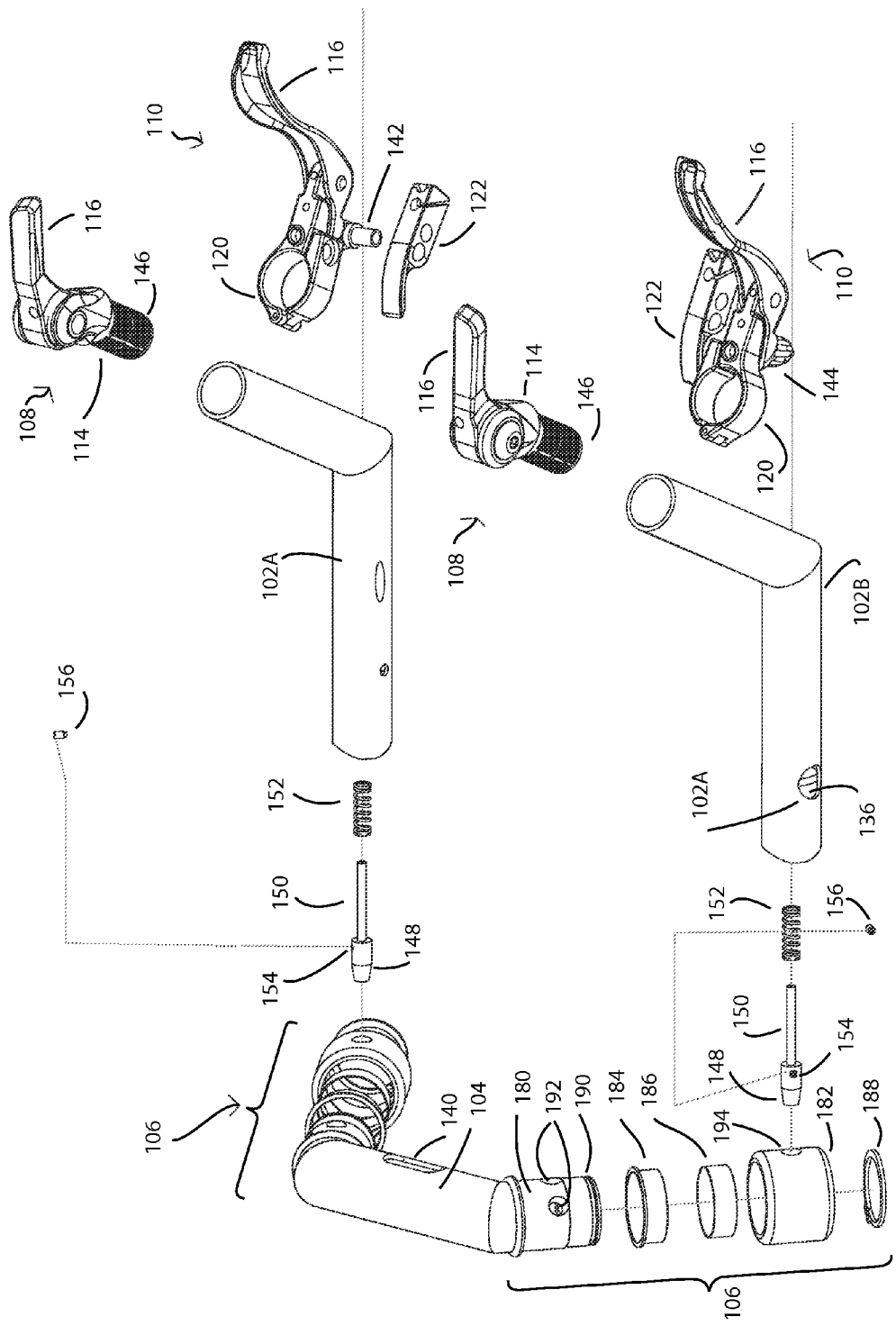
FIG. 6 is an exploded isometric diagram of the handlebar with control components according to an embodiment of the present invention.

Considering the illustrated pivot mechanisms 106 and particular the exploded view provided in FIG. 6, assembly of an arm section 102 to the base section 104 comprises sliding a first annular bushing 184 over the cylindrical portion 180 until it is flush against an associated annular shoulder provided on the cylindrical portion. Next, a shoulder-less second bushing 186 is slid onto the cylindrical portion. The outer cylindrical tube portion 182 of the associated arm section is then slid over the bushings and the underlying cylindrical portion. Finally, the snap ring 188 is placed in the annular groove 190 to secure the arm section to the base section.

Of particular note as most clearly illustrated in FIG. 6, each of the cylindrical portions 180 include two radially extending bores 192 that are similarly longitudinally positioned relative to the axis of rotation of the cylindrical portion but our spaced apart circumferentially on the cylindrical portion's surface. These bores are adapted to selectively receive a lock pin 148 of an associated actuator mechanism therein depending on the positioning of the respective arm section 102 as is described in greater detail below.

Each of the outer cylindrical tube portions 182 includes a radially extending tube bore 194 located at a similar longitudinal position as the radially extending bores 192 relative to the axis of rotation when the arm section is received on and mounted to the base section 104. The aforementioned lock pin 148 is received in this bore such that the lock pin is adapted to move radially therein when an actuator lever 116 of the actuator mechanism is actuated as is also described in greater detail below.

As can be appreciated, it is imperative with the illustrated design that the bushings do not cover the radially extending bores 192 on the cylindrical portions 180 as this would hinder the movement of the lock pin 148 in and out of the bores. As is evident from the illustrations, the interaction of the annular shoulder on the first bushing 184 with an inside edge of the outer cylindrical tube portion prevents the bushing from moving over and covering the bores. Concerning the second bushing 186, it is received on an outer portion of the cylindrical portion that has an outside diameter that is diameter slightly less than the diameter of the remainder of the cylindrical portion. Correspondingly, the inside diameter of the second bushing is slightly smaller to fit properly over the outer portion but it also has a slightly greater thickness such that its outside diameter is substantially similar to the outside diameter of first bushing 184. As can be expected, the inside edge of the second bushing butts up with the edge formed at the transition between the outer portion of the cylindrical portion and the remaining portion of slightly greater diameter preventing the bushing from sliding inwardly and covering the bore holes 192.

As described above, each arm section 102 pivots or rotates around its attachment point to move the left and right arm sections between the first and second positions. The respective actuator mechanisms that include the lock pin 148 mentioned above act to secure the arm sections in the desired position and help limit the range of movement of the arm sections to that which is necessary to move between the two positions. As will become apparent in the review of this disclosure, the actuator mechanism of each arm section can be independently operated so that each section can be moved independently. This enhances safety as a rider can move the arm sections one at a time with the other arm section being locked in place to provide for rider stability and control.

Figure 7:
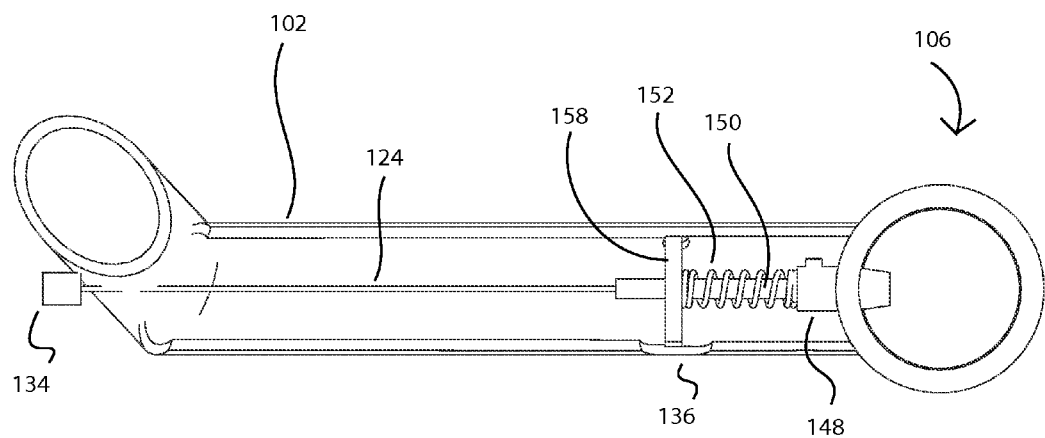
FIG. 7 is a section through one arm of the handlebar showing the actuator mechanism according to an embodiment of the present invention.

The actuator mechanism and each of its components is best illustrated in FIGS. 6 & 7. Each of the left and right actuator mechanisms comprises a lock pin assembly 148, 150, 154, 156 & 158, an actuator lever 122, a connector cable 124 coupling the lock pin assembly with the actuator lever and a biasing mechanism 152.

The lock pin assembly includes the lock pin 148 that has a conically shaped end adapted to slide in and out of the bore holes 192 of the cylindrical portion 180 while also being resident in the radially extending tube bore 194 of the outer cylindrical tube portion 182. When received in both the tube bore 194 and one of the pivot bore holes 192, the lock pin effectively locks the respective arm section 102 in place relative to the base section 104. The lock pin is typically coupled or integral with a smaller diameter rigid tubular shaft 150 that extends from one end of the lock pin. A radially extending bore 154 is provided in the lock pin to receive a set screw 156 therein that is tightened to secure the connector cable 124 in place.

A disk-shaped stop 158 is provided distally of the lock pin 148 and includes an aperture into which the tubular shaft is received. As can best be seen in FIG. 7, the disk is fixedly secured in place within the hollow interior of the arm section 102 at an intermediate location along the section's length. The disk acts as the distal stop for the biasing mechanism, which typically comprises a coil spring 152 that is received over the tubular shaft. The back edge of the lock pin serves as a proximal stop for the coil spring.

As is clear from the figures, as the lock pin 148 is retracted from the bores 192 of the cylindrical portion 180, the coil spring 152 is compressed and applies a restorative force to the pin to urge it back into place against either the surface of the cylindrical portion or into one of the associated bore holes. Retraction is accomplished by operation of the actuator lever 122, which is typically located distally of the lock pin assembly on the outside of the arm section 102 and is connected thereto by way of a connector cable 124 that is typically threaded through the interior of the arm section. The distal end of the cable includes a cable stop that is received in an appropriately configured slot on one end of the lever to hold the cable in place. In variations, the connector cable can be replaced with another type of connector including but not limited to a shaft.

As illustrated the actuator lever 122 is pivotally secured to a corresponding brake lever assembly 110 through a cylindrical boss 142 (see FIG. 6) that extends from the assembly. This location allows for the easily actuation of the lever by the finger of a rider without the rider having to move his/her hand off of the bar or even change the position of his/her hand relative to the bar substantially. In variations and other embodiments, the lever can be attached to the bar's arm section directly by way of a clamp that includes an appropriate mounting boss or by way of a boss that is directly attached to the surface of the corresponding bar section. Other actuator mechanisms are contemplated as well. For instance in one variation the lever could be replaced with a push button that is adapted to retract the lock pin when depressed.

Referring primarily to FIG. 1, the handlebar assembly is typically specified with several control systems. The first control system, as has been discussed in detail above, comprises the left and right actuator mechanisms that lock and unlock the respective arm sections 102 to permit a rider to rotate or pivot the arm sections between first and second positions.

The second control system comprises the left and right brake lever assemblies 110. As mentioned above, in certain variations these levers include bosses 142 mounted on the associated bar clamps 120 to facilitate the mounting of the actuator levers 122 of the actuator mechanisms. The brake levers 118 and their mounting orientation is notable in that the levers extend distally from the clamp 120 away from the rider in sharp contrast to typical prior art levers for use on time trail bars wherein the levers extend generally proximally towards the rider. Accordingly, when riding the rider grips the arm sections 102 in front of the brake clamps 120 with the brake cables and associated housing 130 extending rearwardly from the clamp region, they will not interfere with the rider's hands.

Figure 2:
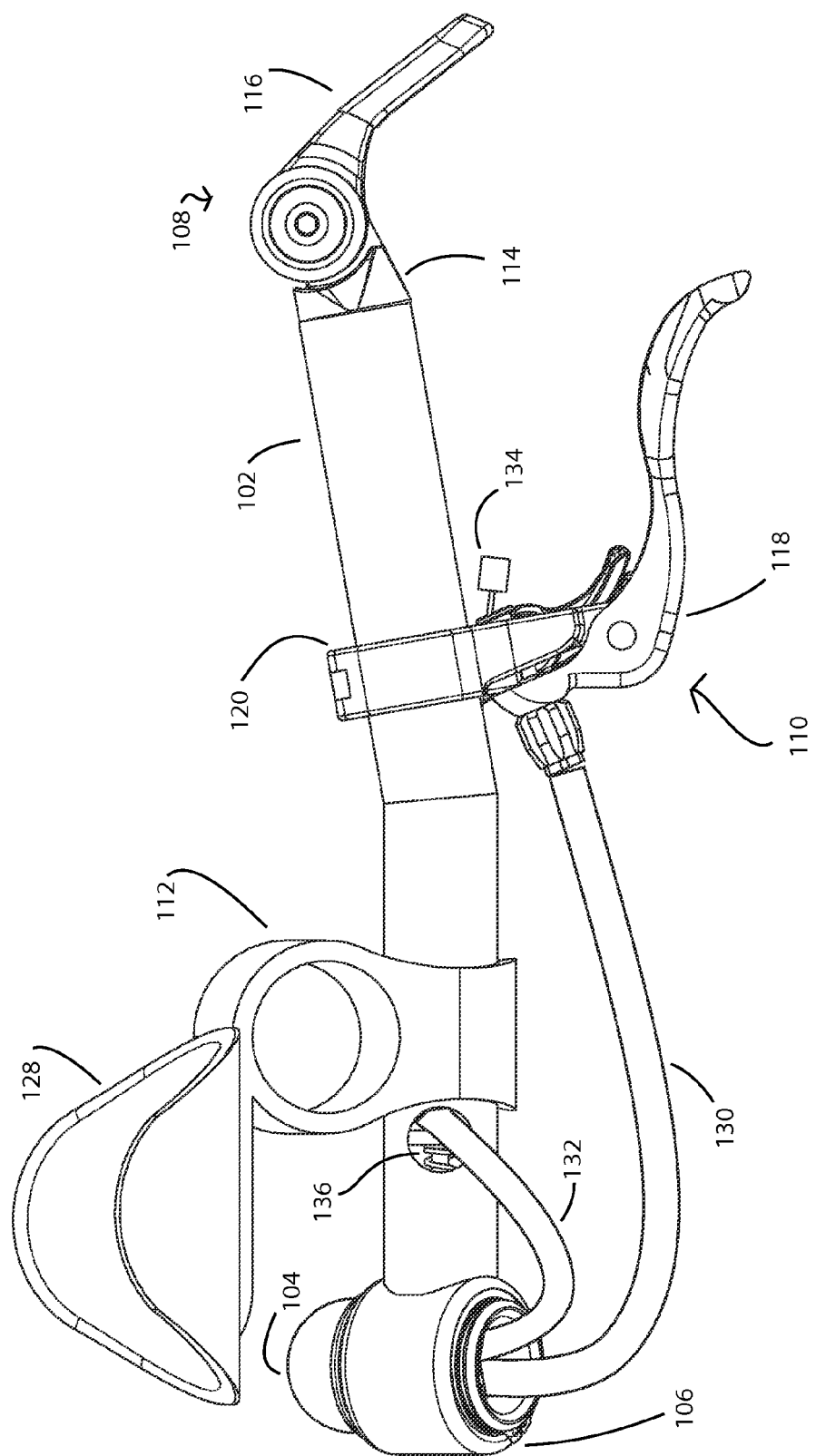
FIG. 2 is a side view of the handlebar in a folded configuration with control components attached according to an embodiment of the present invention.
Figure 3:
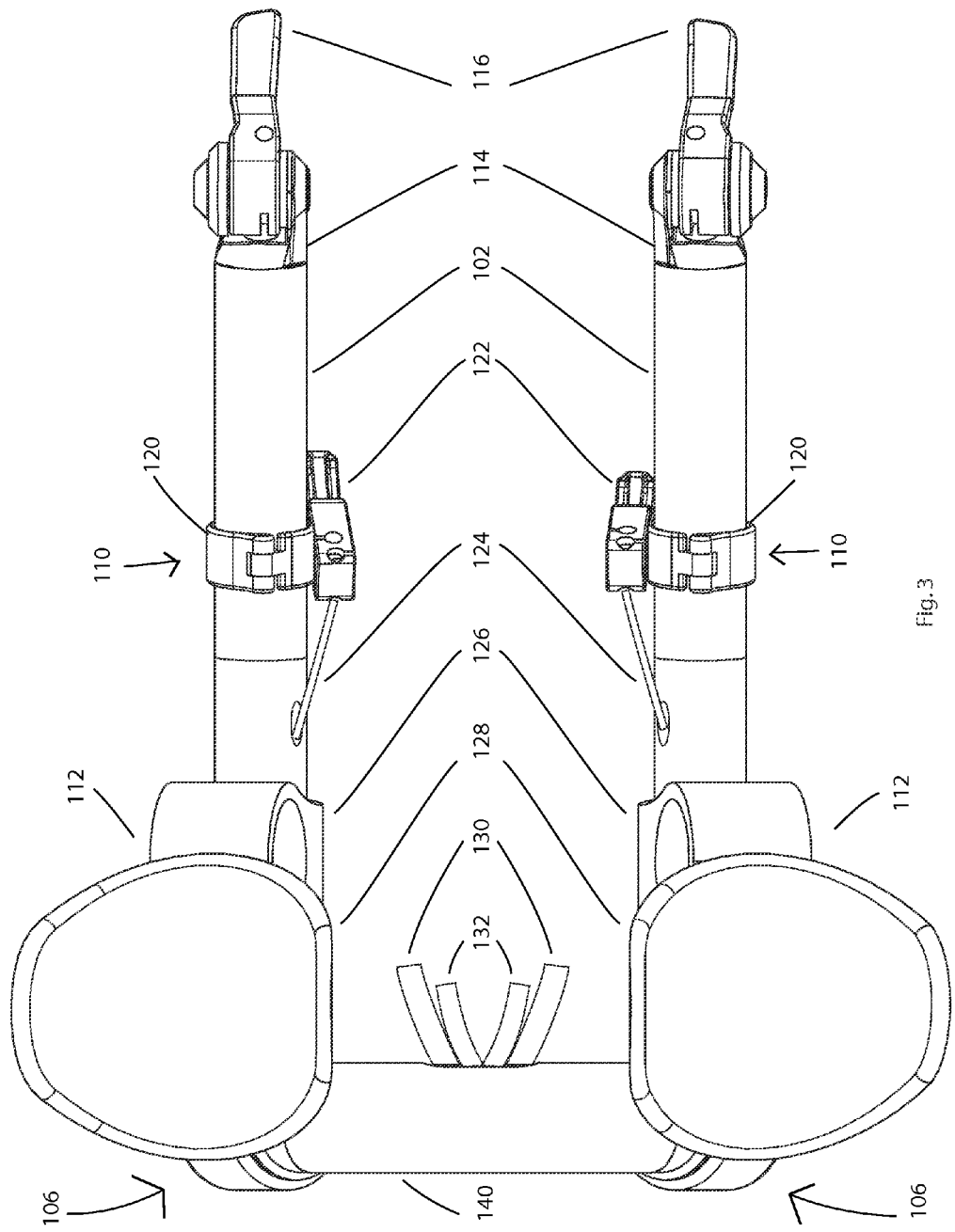
FIG. 3 is a top view of the handlebars in the folded position with control components attached according to an embodiment of the present invention.
Figures 8, 8A:
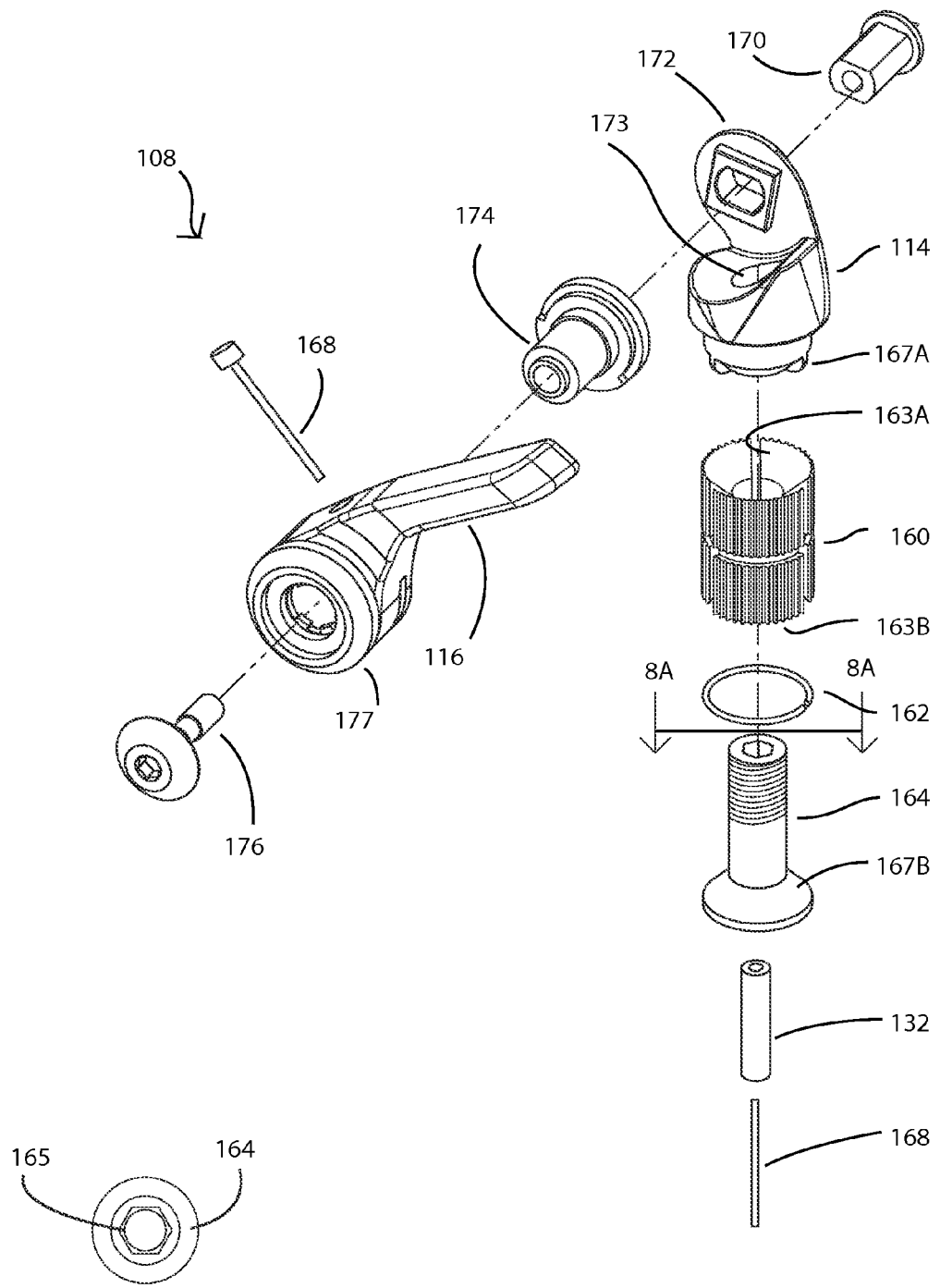
FIG. 8 is an exploded isometric diagram of a bar end shifter with internal cable routing according to an embodiment of the present invention.

The third and final control system comprises one or more thumb shifter assemblies 108. An exploded view of a thumb shifter is shown in FIG. 8. In contrast to prior art thumb shifter assemblies wherein the cable and associated housing are routed generally outwardly and away from the shifter body, embodiments of the shifter assemblies described herein route the cable through the body 114 and through the associated wedge nut or mounting assembly 160-164. Accordingly, the cable and its associated housing 132 & 168 can be routed within the hollow interior of the arm section 102 especially through the portion of the arm sections that are gripped by a rider during use. In the illustrated embodiment as can be seen in FIG. 2, the shift lever cable and housing 132 exits the arm section proximate the proximal end thereof through a provided opening 136. The cable and housing 132 along with the brake lever housing 130 and cable are routed into the hollow interior of the base section 104. The cables exit from the base section near its center through a provided opening 140 as best shown in FIG. 3. From there the cables and housings are routed to the brake callipers and derailleurs of the bike.

With primary reference to FIG. 8, the thumb shifter assembly 108 comprises a shift lever 116 including a bore and/or channel adapted to receive the shift lever cable therein. As can be appreciated, the shift lever may interface with a ratcheting or indexing mechanism 174 that controls the amount of rotation of the lever between tactile stops. The amount of rotation is indexed based on the amount of cable that is pulled or pushed as is necessary to effectuate a gear change in the associated front or rear derailleur. The lever and indexing mechanism are secured to a tang 172 by one or more suitable fasteners 170 & 176. The tang extends from the shifter body 114. The mounting configuration permits the rotational or pivotal movement of the lever relative to the indexing mechanism and the body.

The body includes a threaded longitudinal bore 173 that is adapted to receive the externally threaded hollow shaft of a wedge nut 164. Referring to FIG. 8A, the end of the wedge nut's hollow shaft includes a recessed hexagonal socket 165 adapted to receive a socket wrench therein to selectively loosen or tighten the wedge nut within the body's threaded bore with a hex key/wrench.

Two or more partially annular wedge pieces 160 are provided over the surface of the shaft of the wedge nut 164. Together the pieces form the shape of a cylinder. The pieces are held together by an annular o-ring 162 or spring. The top and bottom surfaces of the assembled wedge pieces form frustoconical indentations 163A&B that mat respectively with frustoconical protrusions 167A&B on the bottom of the body 114 and on the head of the wedge nut. Operationally, when the wedge nut is tightened into the shifter body, the frustoconical protrusions on the wedge nut and body press against the frustoconical indentations and cause the wedge pieces to expand typically against an inside surface of a corresponding arm section 102 thereby securing the thumb shifter 108 therein.

The shifter cable extends through the interior of the wedge nut 164 that extends through the threaded bore 173 of the shifter body and is at least partially wrapped around and received in an annular channel 177 provided around the lever's axis of rotation where its end is secured in a provided cable stop. Of important note, the shift lever is secured to the tang 172 at a position wherein the axis of the longitudinal wedge nut 164, and incidentally the path of the shifter cable 168 within the wedge nut, intersects with the annular channel tangentially. This is in contrast to many prior art thumb shifters wherein the longitudinal axis of the wedge nut, which does not have a cable running therethrough, generally intersects normally with the axis of rotation of the shift lever. Moving the position of the wedge nut's axis relative to the lever's axis of rotation permits the shift cable to be run through a hollow wedge nut without requiring the cable to bend significantly to be received into an annular channel. As can be appreciated any tight and significant bends in the cable proximate the lever would induce a significant amount of friction that would detract from the smooth operation of the thumb shifter.

Still referring to FIG. 8, the shift cable's housing 132 butts up against the bottom end of the wedge nut 164 and in most variations is received in a shallow cavity (not shown). The housing with the cable 168 contained therein extends through the hollow interior of the respective arm section until exiting the arm section 102 through opening 136.

As illustrated, typical variations of the handlebar assembly 100 include a pair of arm rests 112. As shown in FIG. 1, a left or right clamp 126 is secured to a proximal location on the respective left or right arm section 102. A generally concavely-shaped plate 128 is provided on which a rider rests his/her forearms proximate his/her elbows while riding with the bars in the first position. Typically, foam or gel-type padding is provided to enhance comfort. The clamps permit the rider to move the arm rests fore and aft to adjust their position to accommodate a particular rider. It can be appreciated that variations are contemplated wherein no arm rests are provided or wherein the arm rests are provided separately from the bar.

Figure 4:
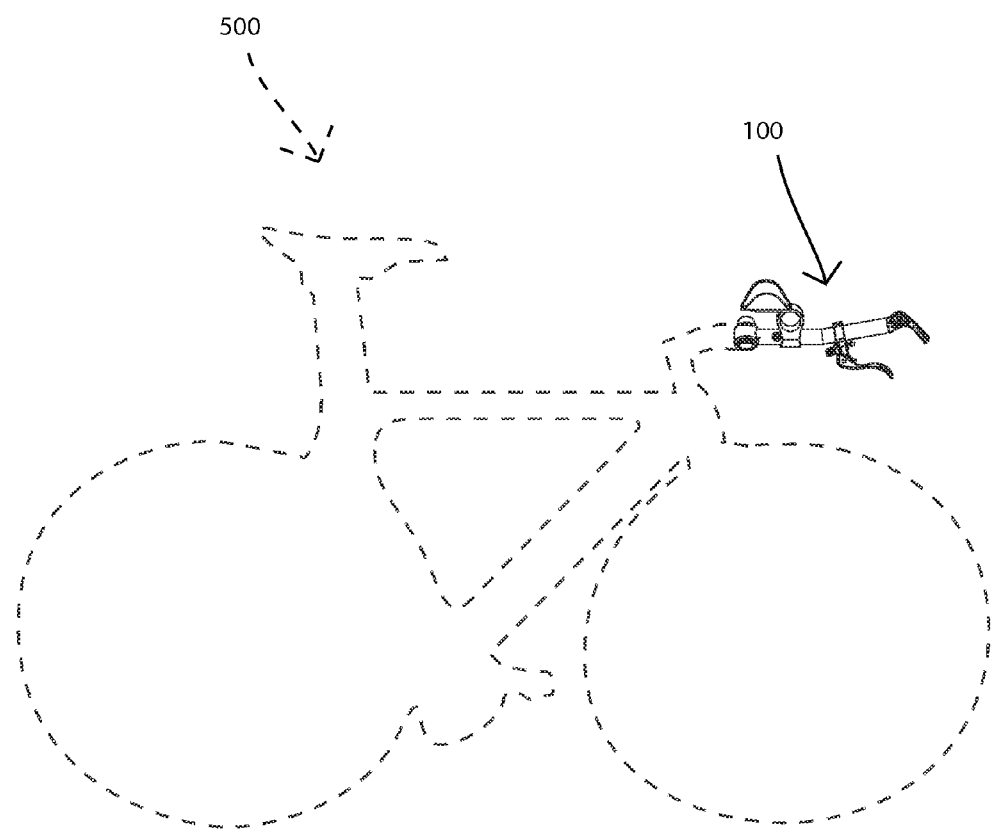
FIG. 4 is a side view illustration showing the location of the handlebar on a typical time trail/triathlon bicycle according to an embodiment of the present invention.
Figure 5:
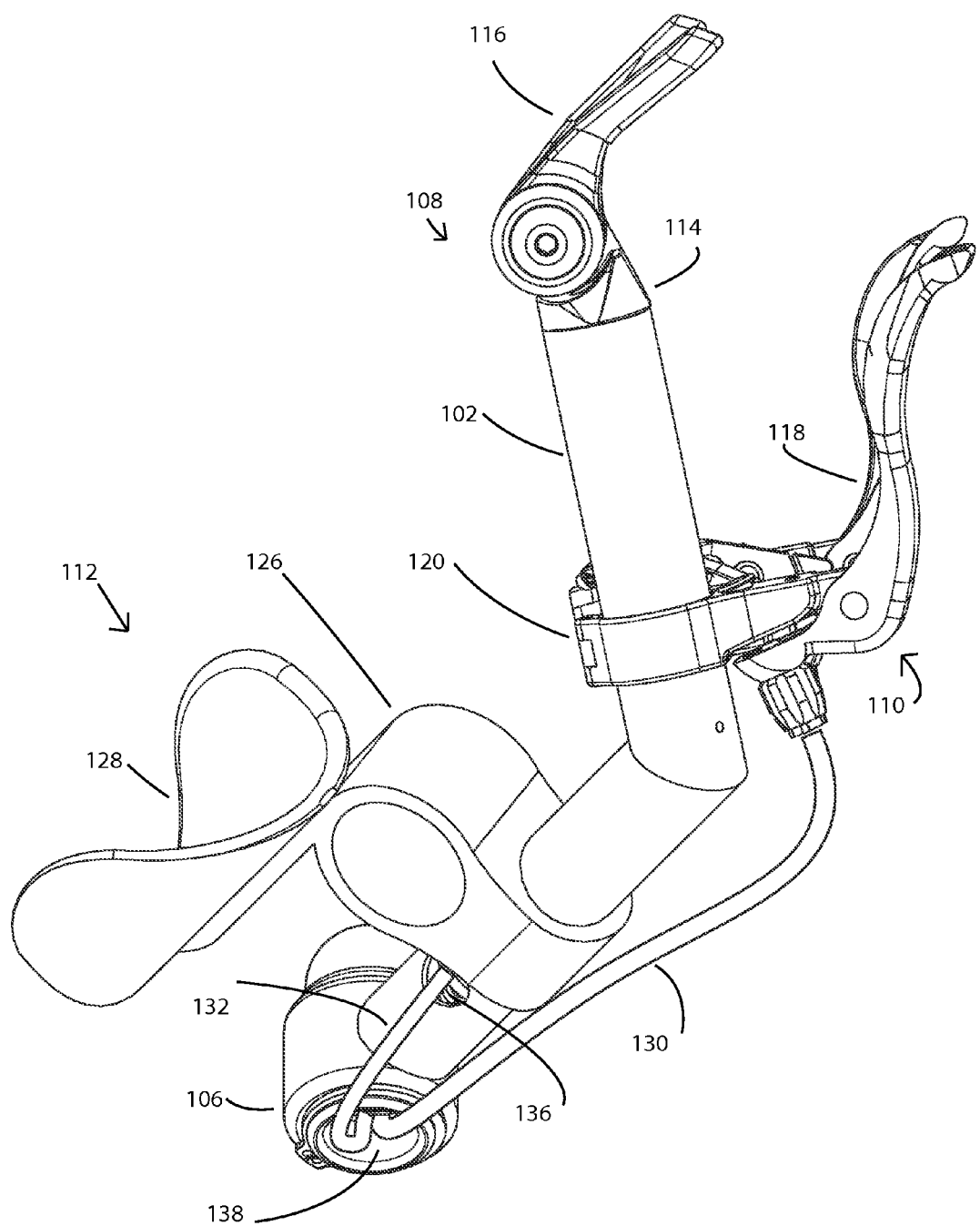
FIG. 5 a side elevation of the unfolded handlebar with control components attached according to an embodiment of the present invention.

As indicated, the configuration of the bars illustrated in FIGS. 1-7 is optimized for use on a traditional upright-style bicycle and more particularly for a time trial or triathlon bicycle. FIG. 4 provides an illustration of the bars installed on a time trial bicycle 500, which is illustrated in broken line.

A Second Embodiment of a Folding Handlebar

Figure 9:
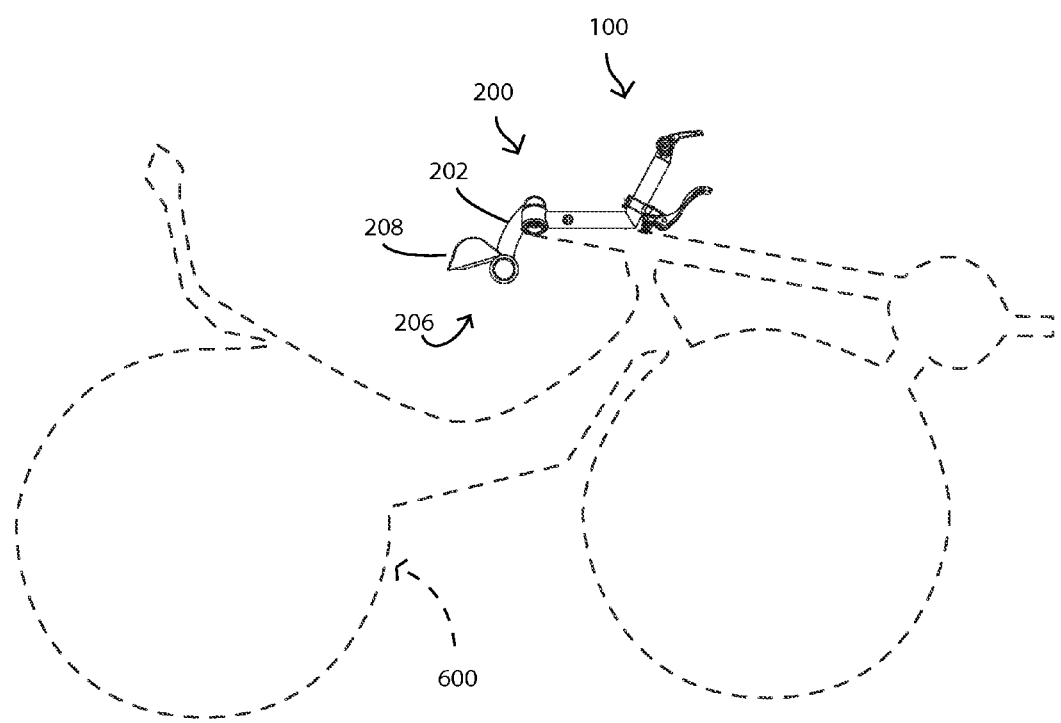
FIG. 9 is a side view illustration showing the location of the handlebar on a typical time recumbent bicycle according to an embodiment of the present invention.
Figure 10:
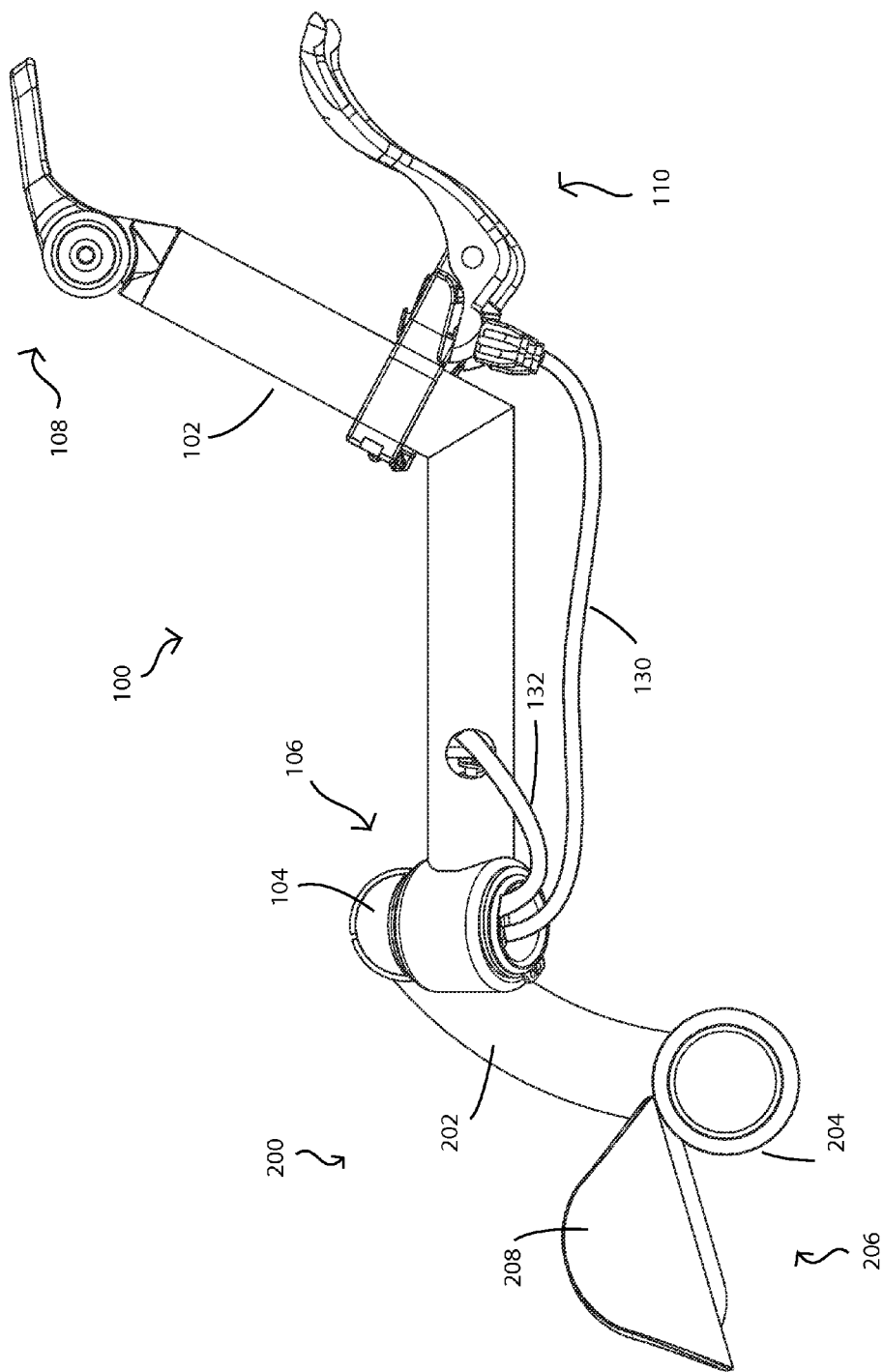
FIG. 10 is a side elevation of the handlebar with control components attached configured for use with a recumbent bicycle according to an embodiment of the present invention.
Figure 11:
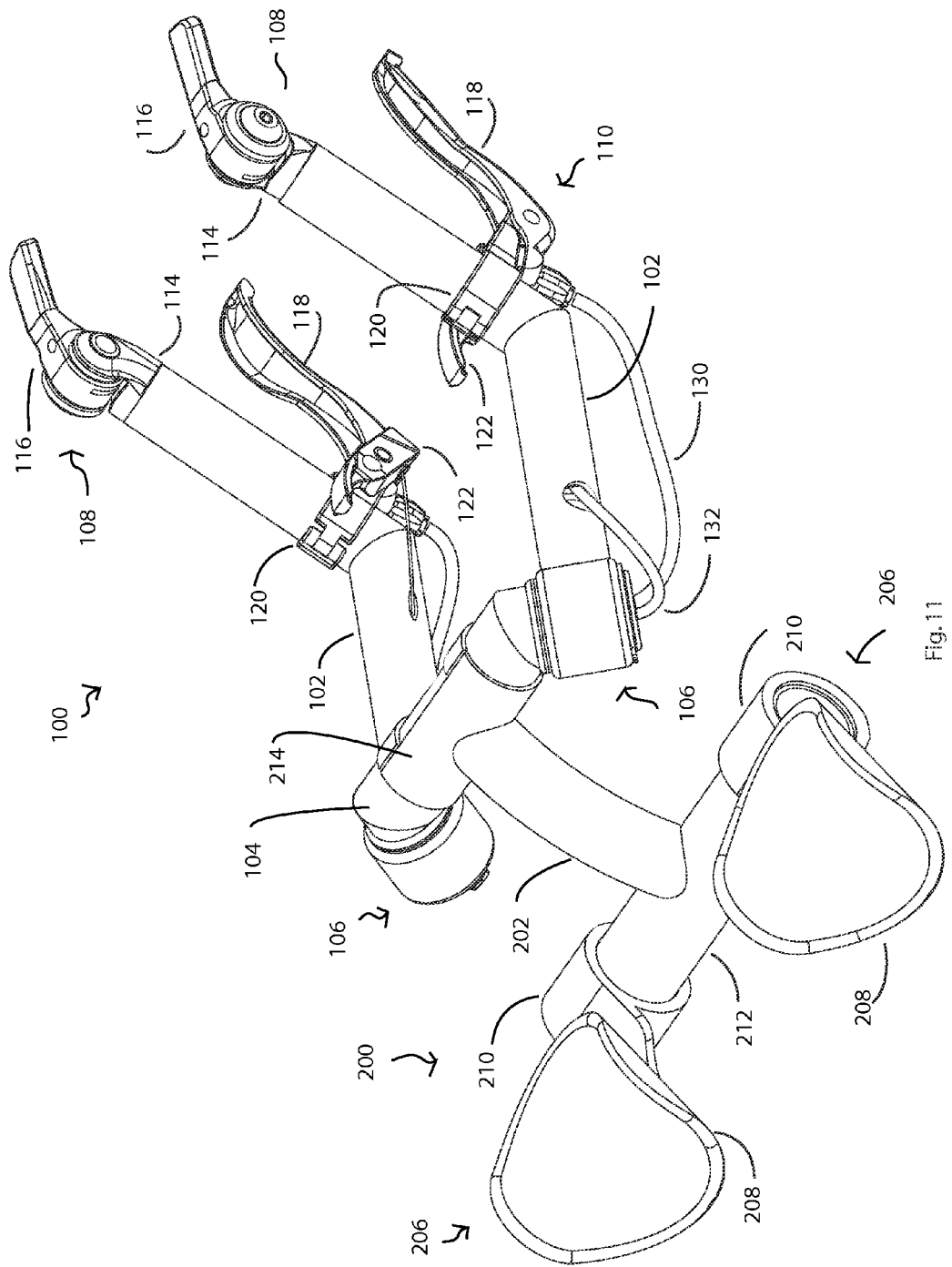
FIG. 11 is an isometric view drawing of the handlebar with control components attached configured for use with a recumbent bicycle according to an embodiment of the present invention.

FIGS. 9-11 provide illustrations from several vantage points of a variation of the first embodiment handlebars configured for use with a recumbent bicycle. Of significance, the arm sections 102A&B, base section 104, the pivot mechanisms 106 and the three control systems are typically substantially identical or similar to those described above with reference to the first embodiment. The second embodiment recumbent style handlebars differ from the first in the absence of the arm section mounting arm rests and the inclusion of a recumbent arm rest extension 200 that extends rearwardly of the base section to provide an new location to mount arm rests that is more suitable for recumbent bicycles and riders. The handlebar assembly installed on a recumbent bicycle is illustrated in FIG. 9 with the recumbent bicycle 600 illustrated in broken lines.

The recumbent arm rest extension 200 comprises a clamp section 214 that secures the assembly to the base section 104. It is to be appreciated that the clamp section is configured not to interfere with the clamp on a stem of the recumbent bicycle that also interfaces with the base section to secure the handlebar assembly to the bicycle. The clamp section is also configured not to interfere with the routing of the various brake and shifter cables and housing as they exit the base section.

An inverted T-section 202 & 212 typically comprised of tubing is secured to the clamp section 214 by welding, brazing or some other suitable means. The leg 202 of the inverted-T extends generally downwardly and rearwardly of the base section. In the illustrated variation, the leg has an arcuate shape but in other variations it can be straight. At the distal end of the leg an arm tube 212 extends to the left and the right to form the arms of the inverted-T. Arm rest assemblies 206, comprising clamps 210 and concavely-shaped plates 208, that are generally similar to the arm rest assemblies described with reference to the first embodiment are mounted to the arm tube.

A Third Embodiment of a Folding Handlebar

Figure 12:
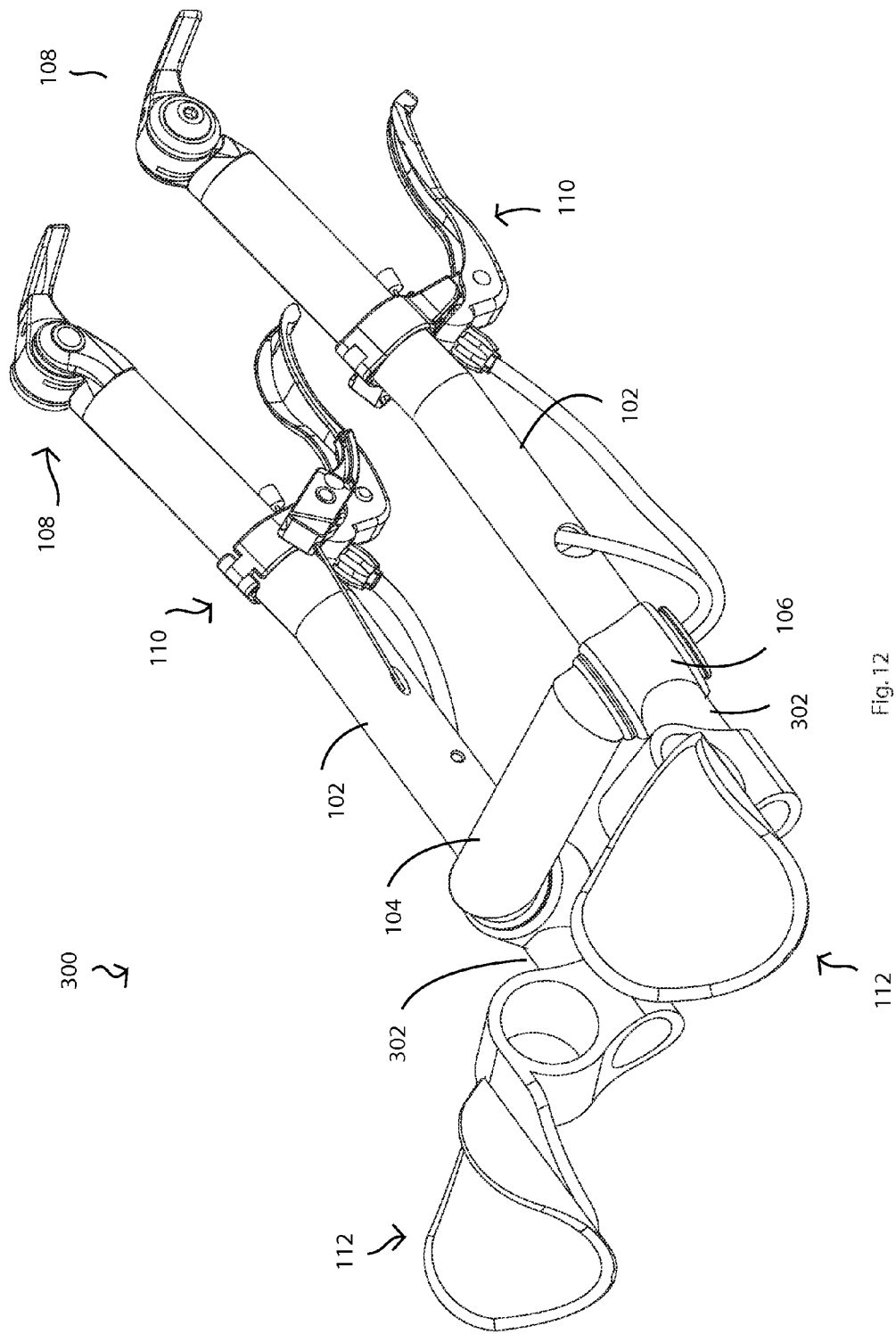
FIG. 12 is an isometric view of the handlebar with control components attached according to another embodiment of the present invention.

FIG. 12 illustrates a third embodiment 300 of folding handlebars wherein left and right extension tubes 302 extend rearwardly from the corresponding cylindrical tube portions 182 of the pivot mechanisms 106. The arm rest assemblies 112 are mounted to the extensions rather than to the arm sections 102.

A Fourth Embodiment of a Folding Handlebar

Figure 13:
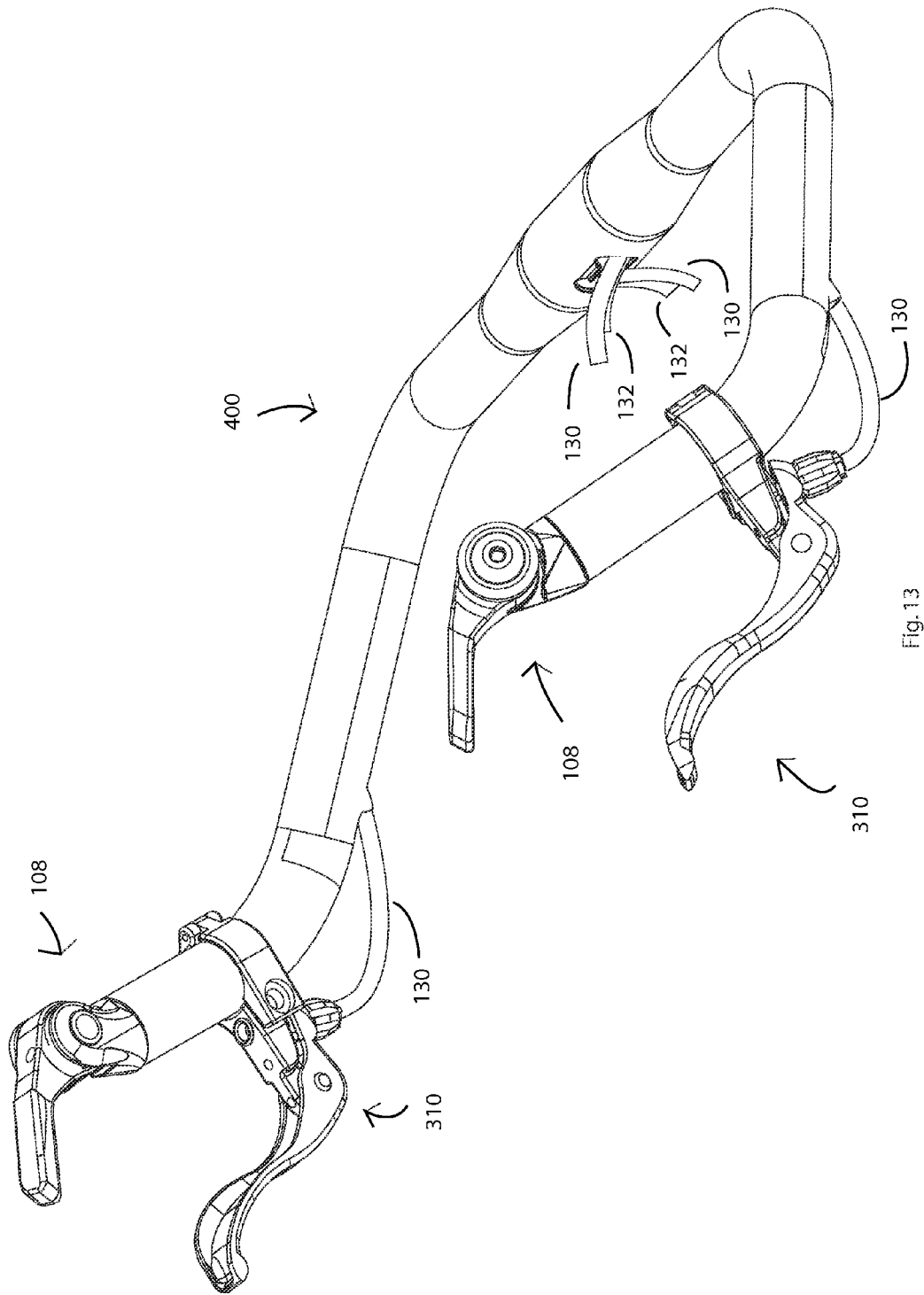
FIG. 13 is an isometric view of fixed handlebar with internal cable control system according to yet another embodiment of the present invention.

FIG. 13 illustrates a four embodiment 400 comprising pair of time trail bars (also known as bullhorn bars) incorporating the control thumb shifters 108 of the first embodiment and a pair of inverted brake levers 310 similar to those described with reference to the first embodiment sans the actuator levers of the actuator mechanism. By relocating and inverting the brake levers as shown and using thumb shifters with internal cable routing, the bars in the vicinity of the handgrips are free of exposed cables that can act to hamper rider comfort.

Figure 14:
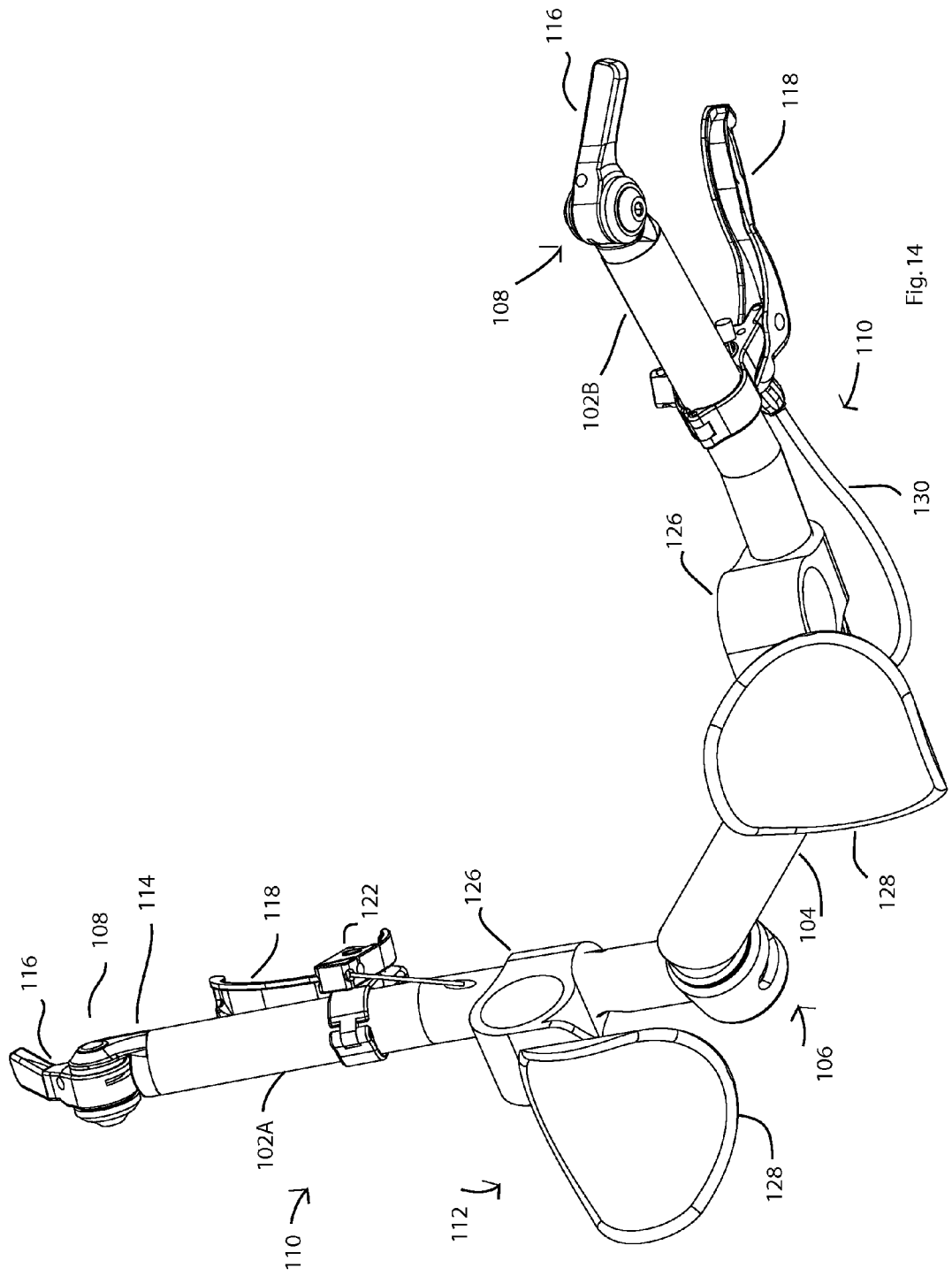
FIG. 14 is an isomeric view of the handlebar in a unfolded configuration with control components attached according to an embodiment of the present invention.
Figure 15:
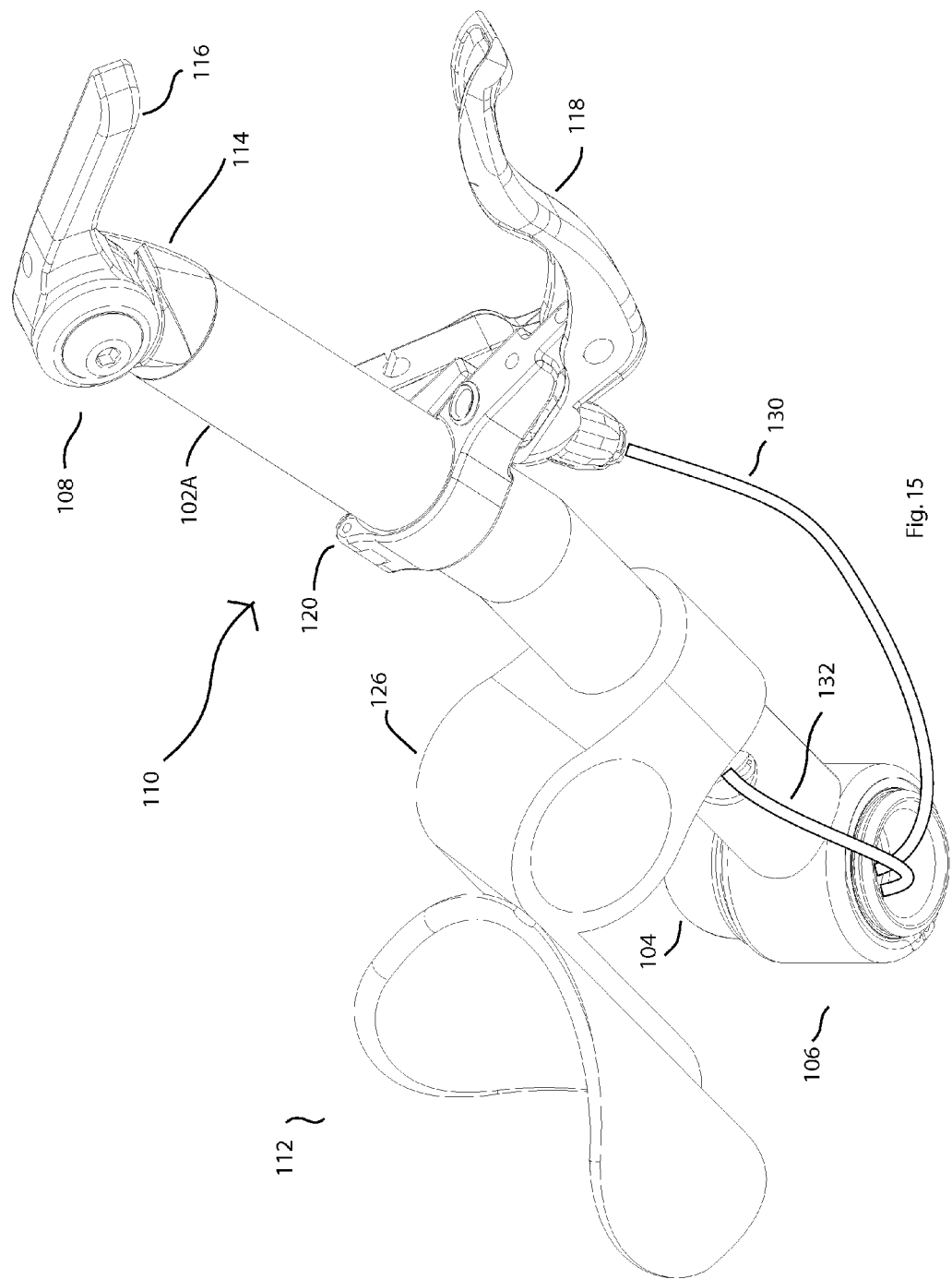
FIG. 15 is a side elevation of the handlebar in the unfolded configuration with control components attached according to an embodiment of the present invention.

A Method of Using the First, Second or Third Embodiment Handlebar Assemblies The folding handlebars of the first and second embodiments permit a rider to move his/her hands from a primarily aerodynamic position on the bars to a second position where the hands and arms are spaced further apart to facilitate free breathing and provide the rider with increased leverage and control as is desirable during pack riding, climbing and sprinting. FIGS. 1 & 3 provide two views of the bars in the first position while FIG. 14 provides a view of the bars in the second position.

To move either arm section 102 from a first position to a second position, a rider need only push the actuator lever 122 for the particular arm section and then apply pressure with his/her hand in the direction that he/she desires to rotate the arm section. Once the pin is retracted and the arm section has been moved slightly relative to its former position, the rider can release the actuator lever. Accordingly, the lock pin 148 is biased against the outside surface of the cylindrical portion 180 of the associated pivot mechanism 106. As the arm section is rotated into the second position, the lock pin is biased into the appropriate bore hole 192 as they become aligned thereby locking the arm section in the desired position.

While it is possible to actuate both actuator levers simultaneously and simultaneously move the left and right arm sections into the other position, this action is not particularly recommended while riding as the rider's control of the bicycle may be compromised while the arms section can freely pivot between positions. A preferred manner of moving the bars from one position to another while riding, comprises first moving one of the left and right arm sections, and then when that section is secured in the new position, moving the other arm section to its new position. Accordingly, the rider can maintain control of the bicycle since at least one arm section is always locked into one of the first and second positions.

Methods of Making the First Embodiment Handlebar Assembly

Numerous methods of making a folding handlebar assembly, such as the one described as the first embodiment, are contemplated as would be obvious to one or ordinary skill in the art given the benefit of this disclosure. The following describes the fabrication of the assembly generally.

Initially, the various elements and components of the assembly will be sourced and provided including the left and right arm sections, the base section, the left and right pivot mechanisms and the left and right actuator mechanisms. Further, the left and right brake lever assembly and left and right thumb shifter assemblies can be provided.

It is to be appreciated that the various components listed above can contain various parts that are also sourced and that the various components are assembled as well. For instance, the arm sections can comprise several tube sections that are welded together at the bend discussed supra and the cylindrical tube portion 182 is also permanently affixed to the arm section typically through welding before the arm section is in a condition to be used in the assembly of the handlebar. In yet another variation of the arm section the bend is provided by bending a provided tube rather than joining two separate tube sections.

The various sections are assembled together. The actuator mechanisms are secured in the interiors of the respective arm sections 102 by securing the disk-shaped stop 158 in place proximate the opening 136 provided in the arm section, such that the lock pin is biased into the radially extending tube bore 194 of the outer cylindrical tube portion 182. The brake lever assemblies 110 are clamped in place on the outside of the arm sections and the cable stop 134 of the connector cable 124 is placed into a receiving slot in the actuator lever 122.

The cylindrical tube portion 182 is received over the cylindrical portion 180 and bushings 184 & 186 of the pivot mechanism and rotatably secured in place with a circular snap ring 188. Next, the thumb shifter assemblies 108 are secured in place along with their respective cables 132 and housings 168. To complete the process, as necessary, the cables and housings for both the brakes and the shifters are routed through the base section 104.

Other Embodiments and Variations

The various embodiments of the handlebar assembly, the combination of the assembly with a bicycle, and the methods of use and making of the handlebar assembly as illustrated in the accompanying figures and/or described above, are merely exemplary and are not meant to limit the scope of the invention. It is to be appreciated that numerous variations to the invention have been contemplated as would be obvious to one of ordinary skill in the art with the benefit of this disclosure. All variations of the invention that read upon the claims are intended and contemplated to be within the scope of the invention.

I claim:

1. Handlebars for a bicycle, the handlebars comprising:
a left arm section having a left proximal end and a left distal end;
a right arm section having a right proximal end and a right distal end;
a base section having left and right base ends;
a left pivot mechanism operatively coupling the left arm section proximate the left proximal end to the base section proximate the left base end;
a right pivot mechanism operatively coupling the right arm section proximate the right proximal end to the base section proximate the right base end;
a left actuator mechanism configured to permit rotation of the left pivot mechanism to move the left arm section relative to the base section between first and second left arm positions when the left actuator mechanism is actuated by a left hand of a user while the left hand is resting on and in contact with the left arm section;
a right actuator mechanism configured to permit rotation of the right pivot mechanism to move the right arm section relative to the base section between first and second right arm positions when the right actuator mechanism is actuated by a right hand of a user while the right hand is resting on and in contact with the right arm section;
wherein (i) each of the left and right pivot mechanisms comprise (a) an inner cylinder having an annular outer surface of a first diameter and defining an axis of rotation and (b) an outer cylindrical tube having an annular inner surface of a second diameter, the second diameter being larger than the first diameter and defining a longitudinal axis thereof, (ii) the outer cylindrical tube is fixedly attached to a respective left or right distal end, (iii) the inner cylinder is fixedly attached to a respective left or right base end, and (iv) the outer cylindrical tube is at least partially rotatably received over the inner cylinder with the axis of rotation and the longitudinal axis being coincident with each other;
wherein each of the left and right actuator mechanisms comprises a lock pin, an actuator lever, and a connector coupling the lock pin with the actuator lever;
wherein the actuator lever of the left actuator mechanism is pivotally coupled with the left arm section at an intermediate location between the distal and proximal ends thereof, and the actuator lever of the right actuator mechanism being pivotally coupled with the right arm section at an intermediate location between the distal and proximal ends thereof;
wherein the inner cylinder includes at least two radially extending cylinder bores that are similarly positioned along the axis of rotation and spaced circumferentially from each other on the annular outer surface; wherein the outer cylindrical tube includes at least one radially extending tube bore located at a similar position along the axis of rotation as the two radially extending cylinder bores; and
wherein the lock pin is received in the radially extending tube bore and is adapted to move radially therein when the lever is actuated; and wherein the lock pin is selectively received in one or the other of the two radially extending cylinder bores when the one radially extending cylinder bore is aligned with the radially extending tube bore.

2. The handlebars of claim 1, wherein the left and right arms sections are substantially tubular including respective hollow left and right interiors.

3. The handlebars of claim 1, wherein the base section is substantially tubular including a hollow base interior.

4. The handlebars of claim 1 further comprising: a left brake lever assembly and a right brake lever assembly, the each of the left and right brake lever assemblies being located and coupled with the respective left or right arm section at an intermediate location between the proximal and distal end of the arm section.

5. The handlebars of claim 4, wherein the left and right brake lever assemblies each include a base section having a clamp securing the lever assembly to the respective arm section, and a brake lever that is pivotally connected to the base section, the brake lever comprising a lever arm with a proximal and distal end, the pivotal connection being proximate the proximal end with the lever arm extending generally in a forward direction such that the distal end thereof is closer to the distal end of the respective arm section than the proximal end of the lever arm.

6. The handlebars of claim 1 wherein the left and right arms sections are substantially tubular including respective hollow left and right interiors; and further include at least one thumb shifter assembly mounted to the left or right distal end of the respective left or right arm section, the thumb shifter assembly including (1) a base member for attaching to the respective left or right arm section, the base member including a cylindrical portion with a longitudinal axis that is received substantially in the hollow interior at the left or right distal end of the respective left or right arm section, the cylindrical portion including a longitudinally extending bore, (2) a shift lever pivotally coupled with the base member, and (3) an elongated shift cable, the shift cable being attached to the shift lever at a proximal end and having a distal end adapted for attachment with a driveline transmission device, the shift cable extending through the longitudinal bore and through a substantial portion of the respective left or right hollow interior.

7. The handlebars of claim 6, wherein the thumb shifter assembly further comprises a cable housing, the cable housing extending from a location proximate a distal end of the cylindrical portion and extending rearwardly through a substantial portion of the respective left or right hollow interior.

8. A method of making the handlebars of claim 1, the method comprising:
providing the left arm section;
providing the right arm section;
providing the base section;
providing left and right pivot mechanisms;
providing left and right actuator mechanisms;
assembling and joining the left arm section, the right arm section, the base section, the left and right pivot mechanisms, and the left and right actuator mechanisms to form the handlebars.

9. A bicycle in combination with the handlebars of claim 1.

10. The handlebars of claim 1, wherein the connector comprises a connector cable.

11. The handlebars of claim 10 wherein the left and right arms sections are substantially tubular including respective hollow left and right interiors, and wherein the cable connector passes through an opening provided in the respective left or right arm section, and wherein at least a portion of the connector cable is routed in the respective hollow left or right interior.

12. A recumbent bicycle in combination with the handlebars of claim 1.

13. A method of a rider using a bicycle including the handlebars of claim 1, the method comprising:
mounting the bicycle by the rider;
riding the bicycle;
using the handlebars to control the direction of the bicycle by holding the handlebars with one or more arms and/or hands of the rider and applying leftward and/or rightward force to the bars through the one or more arms and/or hands;
moving the left arm section from the first left arm position to the second left arm position by actuating the left actuator mechanism and rotating the left pivot mechanism; and
moving the right arm section from the first right arm position to the second right arm position by actuating the right actuator mechanism and rotating the right pivot mechanism.

14. The method of use of claim 13, wherein said moving the left arm section and moving the right arm section is performed while the bicycle is being ridden by the user.

15. The handlebars of claim 1 furthering including left and right arm rests.

16. Handlebars for a bicycle, the handlebars comprising:
a tubular left arm section having a left proximal end, a left distal end, and a substantially hollow interior;
a tubular right arm section having a right proximal end, a right distal end, and a substantially hollow interior;
a tubular and substantially hollow base section having left and right base ends;
a left pivot mechanism operatively coupling the left arm section proximate the left proximal end to the base section proximate the left base end, wherein (i) the left pivot mechanism comprises (a) a left pivot inner cylinder having an annular outer surface of a first diameter and defining an axis of rotation, and (b) a left pivot outer cylindrical tube having an annular inner surface of a second diameter, the second diameter being larger than the first diameter and defining a longitudinal axis thereof; (ii) the left pivot outer cylindrical tube is fixedly attached to the left distal end; (iii) the left pivot inner cylinder is fixedly attached to the left base end; and (iv) the left pivot outer cylindrical tube is at least partially rotatably received over the left pivot inner cylinder with the axis of rotation and the longitudinal axis being coincident with each other;
a right pivot mechanism operatively coupling the right arm section proximate the right proximal end to the base section proximate the right base end, wherein (i) the right pivot mechanism comprises (a) a right pivot inner cylinder having an annular outer surface of a first diameter and defining an axis of rotation, and (b) a right pivot outer cylindrical tube having an annular inner surface of a second diameter, the second diameter being larger than the first diameter and defining a longitudinal axis thereof; (ii) the right pivot outer cylindrical tube is fixedly attached to the right distal end; (iii) the right pivot inner cylinder is fixedly attached to the right base end; and (iv) the right pivot outer cylindrical tube is at least partially rotatably received over the right pivot inner cylinder with the axis of rotation and the longitudinal axis being coincident with each other;
at least one thumb shifter assembly mounted to the left or right distal end of the respective left or right arm section, the thumb shifter assembly including (1) a base member for attaching to the respective left or right arm section, the base member including a cylindrical portion with a longitudinal axis that is received substantially in the hollow interior at the left or right distal end of the respective left or right arm section, the cylindrical portion including a longitudinally extending bore, (2) a shift lever pivotally coupled with the base member, (3) an elongated shift cable, the shift cable being attached to the shift lever at a proximal end and having a distal end adapted for attachment with a driveline transmission device, the shift cable extending through the longitudinal bore and through a substantial portion of the respective left or right hollow interior, and (4) a cable housing, the cable housing extending from a location proximate a distal end of the cylindrical portion and extending rearwardly through a substantial portion of the respective left or right hollow interior;
a left brake lever assembly and a right brake lever assembly, the each of the left and right brake lever assemblies being located and coupled with the respective left or right arm section at an intermediate location between the proximal and distal end of the arm section;
a left actuator mechanism configured to permit rotation of the left pivot mechanism to move the left arm section relative to the base section between first and second left arm positions when the actuator mechanism is actuated by a left hand of a user while the left hand is resting on and in contact with the left arm section;
a right actuator mechanism configured to permit rotation of the right pivot mechanism to move the right arm section relative to the base section between first and second right arm positions when the actuator mechanism is actuated by a right hand of a user while the right hand is resting on and in contact with the right arm section;
wherein each of the left and right actuator mechanisms comprises a lock pin, an actuator lever, a connector cable coupling the lock pin with the actuator lever and a biasing mechanism;
wherein the actuator lever of the left actuator mechanism is pivotally coupled with the left brake lever assembly, and the actuator lever of the right actuator mechanism is pivotally coupled with the right brake arm assembly;
wherein each of the right and left inner cylinders include at least two radially extending cylinder bores that are similarly positioned along the axis of rotation and spaced circumferentially from each other on the annular outer surface of the respective left or right outer cylindrical tube;
wherein each of the left and right outer cylindrical tubes include at least one radially extending tube bore located at a similar position along the axis of rotation as the respective two radially extending cylinder bores; and wherein the lock pin is received in the radially extending tube bore and is adapted to move radially therein when the lever is actuated;
wherein for each of the left and right actuator mechanisms, the lock pin is selectively received in one or the other of the two radially extending cylinder bores when the one radially extending cylinder bore is aligned with the radially extending tube bore;
wherein for each of the left and right actuator mechanisms, the biasing mechanism is configured to bias a distal end of the lock pin radially inwardly relative to the inner cylinder; and wherein for each of the left and right actuator mechanisms the cable connector passes through an opening provided in the respective left or right arm section, and wherein at least a portion of the cable connector is routed in the respective hollow left or right interior.

17. Handlebars for a bicycle, the handlebars comprising:
a left arm section having a left proximal end and a left distal end;
a right arm section having a right proximal end and a right distal end;
a base section having left and right base ends;
a left pivot mechanism operatively coupling the left arm section proximate the left proximal end to the base section proximate the left base end;
a right pivot mechanism operatively coupling the right arm section proximate the right proximal end to the base section proximate the right base end;
a left actuator mechanism configured to permit rotation of the left pivot mechanism to move the left arm section relative to the base section between first and second left arm positions when the left actuator mechanism is actuated by a left hand of a user while the left hand is resting on and in contact with the left arm section; and
a right actuator mechanism configured to permit rotation of the right pivot mechanism to move the right arm section relative to the base section between first and second right arm positions when the right actuator mechanism is actuated by a right hand of a user while the right hand is resting on and in contact with the right arm section;
wherein the left and right arms sections are substantially tubular including respective hollow left and right interiors; and further include at least one thumb shifter assembly mounted to the left or right distal end of the respective left or right arm section, the thumb shifter assembly including (1) a base member for attaching to the respective left or right arm section, the base member including a cylindrical portion with a longitudinal axis that is received substantially in the hollow interior at the left or right distal end of the respective left or right arm section, the cylindrical portion including a longitudinally extending bore, (2) a shift lever pivotally coupled with the base member, and (3) an elongated shift cable, the shift cable being attached to the shift lever at a proximal end and having a distal end adapted for attachment with a driveline transmission device, the shift cable extending through the longitudinal bore and through a substantial portion of the respective left or right hollow interior.

18. Handlebars for a bicycle, the handlebars comprising:
a left arm section having a left proximal end and a left distal end;
a right arm section having a right proximal end and a right distal end;
a base section having left and right base ends;
a left pivot mechanism operatively coupling the left arm section proximate the left proximal end to the base section proximate the left base end;
a right pivot mechanism operatively coupling the right arm section proximate the right proximal end to the base section proximate the right base end;
a left actuator mechanism configured to permit rotation of the left pivot mechanism to move the left arm section relative to the base section between first and second left arm positions when the left actuator mechanism is actuated by a left hand of a user while the left hand is resting on and in contact with the left arm section;
a right actuator mechanism configured to permit rotation of the right pivot mechanism to move the right arm section relative to the base section between first and second right arm positions when the right actuator mechanism is actuated by a right hand of a user while the right hand is resting on and in contact with the right arm section;
a left brake lever assembly and a right brake lever assembly, the each of the left and right brake lever assemblies being located and coupled with the respective left or right arm section at an intermediate location between the proximal and distal end of the arm section; wherein each of the left and right actuator mechanisms comprises a lock pin, an actuator lever, and a connector coupling the lock pin with the actuator lever;
wherein (i) each of the left and right pivot mechanisms comprise (a) an inner cylinder having an annular outer surface of a first diameter and defining an axis of rotation and (b) an outer cylindrical tube having an annular inner surface of a second diameter, the second diameter being larger than the first diameter and defining a longitudinal axis thereof, (ii) the outer cylindrical tube is fixedly attached to a respective left or right distal end, (iii) the inner cylinder is fixedly attached to a respective left or right base end, and (iv) the outer cylindrical tube is at least partially rotatably received over the inner cylinder with the axis of rotation and the longitudinal axis being coincident with each other;
wherein the actuator lever of the left actuator mechanism is pivotally coupled with left brake lever assembly, and the actuator lever of the right actuator mechanism is pivotally coupled with the right brake arm assembly;
wherein the inner cylinder includes at least two radially extending cylinder bores that are similarly positioned along the axis of rotation and spaced circumferentially from each other on the annular outer surface;
wherein the outer cylindrical tube includes at least one radially extending tube bore located at a similar position along the axis of rotation as the two radially extending cylinder bores; and wherein the lock pin is received in the radially extending tube bore and is adapted to move radially therein when the lever is actuated; and
wherein the lock pin is selectively received in one or the other of the two radially extending cylinder bores when the one radially extending cylinder bore is aligned with the radially extending tube bore.

\* \* \* \* \*